(12) United States Patent
Powell et al.

(10) Patent No.: US 11,572,286 B2
(45) Date of Patent: Feb. 7, 2023

(54) SYSTEMS AND METHODS FOR A LOW ENVIRONMENTAL IMPACT TREATMENT OF CONTAMINATED FLUID

(71) Applicant: 1934612 Ontario Inc., London (CA)

(72) Inventors: Anthony L. Powell, London (CA); Brian E. Butters, London (CA)

(73) Assignee: 1934612 ONTARIO INC., London (CA)

(*) Notice: Subject to any disclaimer, the term of this patent is extended or adjusted under 35 U.S.C. 154(b) by 0 days.

(21) Appl. No.: 16/283,590

(22) Filed: Feb. 22, 2019

(65) Prior Publication Data
US 2019/0263676 A1    Aug. 29, 2019

Related U.S. Application Data

(60) Provisional application No. 62/634,475, filed on Feb. 23, 2018.

(51) Int. Cl.
C02F 1/00    (2006.01)
C02F 1/44    (2006.01)
(Continued)

(52) U.S. Cl.
CPC ............ C02F 1/001 (2013.01); C02F 9/00 (2013.01); *C02F 1/32* (2013.01); *C02F 1/441* (2013.01);
(Continued)

(58) Field of Classification Search
CPC ........ C02F 1/001; C02F 9/00; C02F 2301/08; C02F 2303/24; C02F 1/74; C02F 3/04;
(Continued)

(56) References Cited

U.S. PATENT DOCUMENTS 4,214,887 A * 7/1980 van Gelder ............. C02F 11/13
                                                   210/764
5,118,422 A * 6/1992 Cooper ..................... C02F 1/325
                                                   210/636
(Continued)

FOREIGN PATENT DOCUMENTS

EP       2 374 526 A1 * 10/2011
WO       2011005928 A1   1/2011
WO       WO-2011160186 A1 * 12/2011    ............... A61L 2/10

OTHER PUBLICATIONS

International Search Report and Written Opinion of the International Searching Authority dated Jul. 4, 2019 in connection with International Application No. PCT/IB2019/051473, 13 pages.
(Continued)

*Primary Examiner* — Claire A Norris
(74) *Attorney, Agent, or Firm* — Baker & McKenzie LLP

(57) ABSTRACT

In some embodiments, the present disclosure relates to a system for treating an intake fluid comprising a contaminant, the system comprising a strainer configured to receive the intake fluid and separate the intake fluid into a first retentate and a strained filtrate; a filtration unit connected to the strainer through a strained fluid connector, the strained fluid connector configured to facilitate transfer of the strained filtrate from the strainer to the filtration unit, wherein the filtration unit is configured to separate the strained filtrate into a second retentate and a filtration unit filtrate; a fixed film biological filter connected to the filtration unit through a filtrate connector, the filtrate connector configured to facilitate transfer of the filtration unit filtrate from the filtration unit to the fixed film biological filter, wherein the fixed film biological filter is configured to reduce a biological oxygen demand of at least one of the filtration unit filtrate and a contaminant concentrating module permeate to form a permeate; and a CCM connected to a first retentate connec-
(Continued)

tor and a second retentate connector, the first retentate connector configured to facilitate transfer of the first retentate from the strainer to the CCM, the second retentate connector configured to facilitate transfer of the second retentate from the filtration unit to the CCM, wherein the CCM is configured to separate each of the first retentate and the second retentate into a third retentate and the contaminant concentrating module permeate.

20 Claims, 3 Drawing Sheets

(51) Int. Cl.
| | |
|---|---|
| *C02F 3/28* | (2006.01) |
| *C02F 3/04* | (2006.01) |
| *C02F 1/74* | (2006.01) |
| *C02F 1/52* | (2006.01) |
| *C02F 1/32* | (2006.01) |
| *C02F 3/30* | (2006.01) |
| *C02F 9/00* | (2006.01) |

(52) U.S. Cl.
CPC .............. *C02F 1/5245* (2013.01); *C02F 1/74* (2013.01); *C02F 3/04* (2013.01); *C02F 3/28* (2013.01); *C02F 3/302* (2013.01); *C02F 2301/08* (2013.01); *C02F 2303/24* (2013.01); *C02F 2305/10* (2013.01)

(58) Field of Classification Search
CPC ........ C02F 1/32; C02F 2305/10; C02F 3/302; C02F 3/28; C02F 1/441
See application file for complete search history.

(56) References Cited

U.S. PATENT DOCUMENTS

| | | | |
|---|---|---|---|
| 5,589,078 A | 12/1996 | Butters et al. | |
| 8,551,341 B2* | 10/2013 | Conner | C02F 3/1268 210/739 |
| 8,685,252 B2* | 4/2014 | Vuong | B01D 61/04 210/321.7 |
| 8,871,089 B2* | 10/2014 | Early | C02F 3/1242 210/201 |
| 9,827,536 B2* | 11/2017 | Yoneda | B01D 71/68 |
| 10,005,686 B2 | 6/2018 | Powell et al. | |
| 2006/0169636 A1 | 8/2006 | Devine | |
| 2007/0084791 A1 | 4/2007 | Jordan et al. | |
| 2011/0203992 A1 | 8/2011 | Liu et al. | |
| 2013/0048560 A1* | 2/2013 | Lord | B01D 61/20 210/636 |
| 2014/0224717 A1* | 8/2014 | Juby | H01M 8/16 210/151 |
| 2015/0122740 A1* | 5/2015 | Powell | B01D 19/0005 210/704 |

OTHER PUBLICATIONS

Wikipedia, "Breadboard", retrieved from https://en.wikipedia.org/wiki/Breadboard, May 24, 2021, 9 pages.

* cited by examiner

SYSTEMS AND METHODS FOR A LOW ENVIRONMENTAL IMPACT TREATMENT OF CONTAMINATED FLUID

CROSS-REFERENCE TO RELATED APPLICATIONS

This application claims priority to U.S. Provisional Patent Application No. 62/634,475 filed on Feb. 23, 2018. The contents of the above application are hereby incorporated in its entirety by reference.

FIELD OF THE DISCLOSURE

The present disclosure relates, in some embodiments, to fluid treatment systems capable of removing contaminants and gaseous emissions from contaminated fluids in a manner that has a reduced impact on the environment.

BACKGROUND OF THE DISCLOSURE

Existing water purification systems produce clean water, but do so at the cost of polluting the environment with their toxic waste byproducts. For example, systems that rely on chemical treatments (e.g., antibiotics) to remove biological contaminants from water eventually expose native biomes to these chemicals once the chemically treated water leaves the system. The residual chemicals (e.g., antibiotics) leak into aquatic ecosystems, disrupting native biomes and leading to a disruption of the ecosystem as a whole.

As another example, some systems employ filtering methods that physically separate contaminants such as sludge and salts from the water being purified. Unfortunately, as the separated contaminants are aggregated, they form large and highly concentrated contaminant sources that are severely toxic. This toxic waste must be disposed of carefully to avoid significantly damaging human and animal life. New systems are needed that transform these toxic waste products into less hazardous and useful byproducts (e.g., fertilizers).

Additionally, many existing purification systems produce and release greenhouse gases such as ammonia into the environment. To avoid further damage to the ozone layer, new systems need to be developed that contain gases produced throughout the purification process and transform them into benign or useful materials.

SUMMARY

Accordingly, a need has arisen for improved fluid purification. For example, a need exists for fluid purification systems, and methods with a reduced environmental impact.

A disclosed system for treating an intake fluid comprising a contaminant includes a strainer configured to receive the intake fluid and separate the intake fluid into a first retentate and a strained filtrate. In some embodiments, a disclosed system may include a filtration unit connected to a strainer through a strained fluid connector, the strained fluid connector may be configured to facilitate transfer of a strained filtrate from the strainer to the filtration unit. A filtration unit may be configured to separate a strained filtrate into a second retentate and a filtration unit filtrate. A disclosed fixed film biological filter may connect to a filtration unit through a filtrate connector. A filtrate connector may be configured to facilitate transfer of a filtration unit filtrate from a filtration unit to a fixed film biological filter. A fixed film biological filter may be configured to reduce a biological oxygen demand of at least one of a filtration unit filtrate and a contaminant concentrating module permeate to form a permeate. A disclosed contaminant concentrating module (CCM) may connect to a first retentate connector and a second retentate connector. A first retentate connector may be configured to facilitate transfer of a first retentate from a strainer to a CCM, a second retentate connector may be configured to facilitate transfer of a second retentate from a filtration unit to a CCM. A CCM may be configured to separate each of a first retentate and a second retentate into a third retentate and a contaminant concentrating module permeate.

According to some embodiments, a system may include at least one of an anaerobic digester, a photocatalytic reactor, a reverse-osmosis filter module, and a denitrification bioreactor, with each of these components being connected via one or more coupling devices.

An anaerobic digester may be configured to digest at least one of a first retentate, a second retentate, and a third retentate to produce a digestate and a gas. A photocatalytic reactor may be configured to expose at least one of a permeate, a reverse-osmosis permeate, and a reduced nitrate permeate to a photocatalytic reaction to generate a photocatalytic permeate. A reverse-osmosis filter module may be configured to reverse-osmosis filter at least one of a permeate, a photocatalytic permeate, and a reduced nitrate permeate to generate a reverse-osmosis permeate. A denitrification bioreactor may be configured to expose at least one of a permeate, a photocatalytic permeate, and a reverse-osmosis permeate to a denitrification reaction to generate a reduced nitrate permeate.

In some embodiments, a strainer may include a rotation drum strainer. A disclosed filtration unit may include an aeration unit connected to a strainer through a strained fluid connector and may be configured to receive a strained filtrate and to generate an aerated fluid. A filtration unit may include a chemical inlet disposed downstream of an aeration unit. A chemical inlet may be configured to meter an additive into an aerated fluid. A disclosed filtration unit may include a reactor tank disposed downstream of a chemical inlet. A reactor tank may be configured to receive and retain an aerated fluid comprising an additive for a retention time generating a retained fluid. A ceramic membrane may be configured to receive and filter a retained fluid generating a filtration unit filtrate. A filtration unit may be configured to remove greater than about 75% of solubilized contaminants from a strained filtrate. A permeate formed by a fixed film biological filter may include at least one of a biological oxygen demand of less than about 30 ppm and a chemical oxygen demand of less than about 200 ppm.

A fixed film biological filter may include a biologically activated carbon filter. A disclosed filtration unit may be configured to remove greater than about 75% of solubilized contaminants from a strained filtrate. A CCM may include a housing tank, a porous membrane, and a dynamic shock generator. A porous membrane may include a tylose binder. A disclosed anaerobic digester may include an anaerobic digester tank, a mixer, and a microorganism. A photocatalytic reactor may include a photocatalytic reactor tank, a UV light source, a photocatalytic reactor membrane, a titanium dioxide, and a titanium dioxide supply tank. A reverse-osmosis filter module may include a reverse-osmosis filter housing, a high pressure pump, and a semipermeable membrane. A semipermeable membrane may include a filter pore size of from 0.1 nm to 5 nm. A denitrification bioreactor may include a denitrification housing, a denitrification bioreactor membrane, and wood chips.

A method for treating an intake fluid comprising a contaminant may include: straining the intake fluid with a strainer to form a first retentate and a strained filtrate, filtering a strained filtrate with a filtration unit to form a second retentate and a filtration unit filtrate and separating at least one of a first retentate and a second retentate into a third retentate and a contaminant concentrating module permeate. In some embodiments, a method may include filtering at least one of a filtration unit filtrate, and a contaminate concentrating module permeate with a fixed film biological filter to form a permeate.

A method may include anaerobically digesting at least one of a first retentate, a second retentate, and a third retentate to generate a digestate and a gas. A disclosed method may include exposing at least one of a permeate, a reverse-osmosis permeate, and a reduced nitrate permeate to a photocatalytic reaction to generate a photocatalytic permeate. In some embodiments, a method may include reverse-osmosis filtering at least one of a permeate, a photocatalytic permeate, and a reduced nitrate permeate to generate a reverse-osmosis permeate. A method may include exposing at least one of a permeate, a photocatalytic permeate, and a reverse-osmosis permeate to a denitrification reaction to generate a reduced nitrate permeate. A disclosed method may include producing a reduced nitrate permeate with a denitrification bioreactor.

Filtering a strained filtrate with a filtration unit may include aerating a strained filtrate through an aeration unit to produce an aerated fluid, metering an additive from a chemical inlet into the aerated fluid, retaining an aerated fluid comprising the additive in a reactor tank to generate a retained fluid, and filtering a retained fluid through a ceramic membrane to form a filtration unit filtrate. Filtering a strained filtrate with a filtration unit may include removing greater than about 75% of solubilized contaminants from the strained filtrate. A permeate may have a biological oxygen demand of less than about 30 ppm and a chemical oxygen demand of less than about 200 ppm. According to some embodiments, filtering at least one of a filtration unit filtrate and a contaminate concentrating module permeate with a fixed film biological filter may include receiving at least one of the filtration unit filtrate and the contaminate concentrating module permeate in a biological filter tank. Filtering may include contacting at least one of a filtration unit filtrate and a contaminate concentrating module permeate with a packing material in a biological filter tank and filtering at least one of the filtration unit filtrate and the contaminate concentrating module permeate through a biological filter membrane to produce a permeate.

In some embodiments, separating at least one of a first retentate and a second retentate may include receiving at least one of the first retentate and the second retentate in a contaminant concentrating module housing, and using a porous membrane contained within the containment concentrating module housing to separate at least one of the first retentate and the second retentate into a third retentate and a contaminant concentrating module permeate.

In some embodiments, anaerobically digesting may include receiving at least one of a first retentate, a second retentate, and a third retentate in an anaerobic digester tank; combining at least one of the first retentate, the second retentate, and the third retentate with a microorganism inside the anaerobic digester tank to form a microorganism/retentate mixture; and microbially digesting the microorganism/retentate mixture to produce a digestate and the a gas.

BRIEF DESCRIPTION OF THE DRAWINGS

Some embodiments of the disclosure may be understood by referring, in part, to the present disclosure and the accompanying drawings, wherein.

DETAILED DESCRIPTION

The present disclosure relates to systems and methods for removing contaminates—such as pathogens, chemicals, gases, biologics, and solid materials—from a contaminated fluid in a manner that has a reduced environmental impact (e.g., a small carbon footprint) compared to existing systems and methods. Existing methods produce toxic waste products and greenhouse gases that threaten the environment while increasing waste containment and disposal costs. In contrast, disclosed methods may advantageously treat an intake fluid comprising contaminates while turning toxic waste products and greenhouse gases into benign byproducts (e.g., fertilizers, benign gases). A solid separated with disclosed systems and methods may be used to generate and capture methane fuel, nitrates may be converted to benign nitrogen gas that is stored, and both biochemical and chemical oxygen demand values may be reduced by eliminating oxygen demanding substances.

Figure 1:
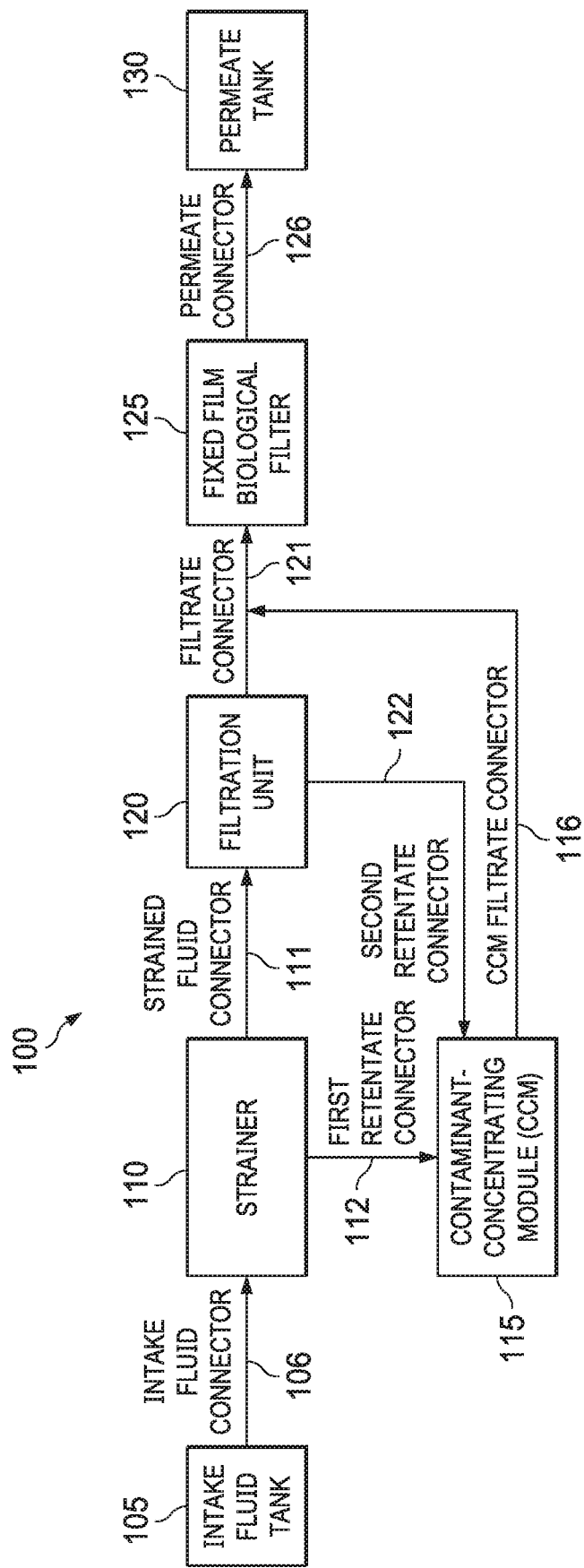
FIG. 1 illustrates a schematic view of a decontamination system for removing contaminants from an intake fluid according to a specific example embodiment of the disclosure.

FIG. 1 illustrates a fluid purification system 100 configured to remove one or more contaminants (e.g., bacterial) from contaminated fluid according to specific example embodiments of the disclosure. A disclosed system 100 includes an intake fluid tank 105, a strainer 110, a contaminant concentrating module (i.e., a CCM) 115, a filtration unit 120, a fixed film biological filter 125, a permeate stream tank 130, and a series of connectors 106, 111, 112, 122, 121, 116, 126 that are configured to fluidly connect the system components and provide paths for fluid and solid transport.

A fluid purification system 100 may include an intake fluid tank 105 that serves as an initial storage unit for contaminated fluid. An intake fluid tank 105 may be upstream from and be fluidly connected to a strainer 110 through an intake fluid connector 106. Fluid connector 106 may be configured to facilitate transfer of a contaminated fluid from intake fluid tank 105 to filtration unit 120. A strainer 110 may be configured to separate a contaminated fluid into a first retentate and a strainer filtrate, for example using a screen (e.g., a rotating screen). Strained fluid connector 111 may be configured to fluidly connect strainer 110 and filtration unit 120 thereby facilitating transfer of a strainer filtrate to filtration unit 120. First retentate connector 112 may be configured to fluidly connect strainer 110 and contaminant concentrating module (CCM) 115 thereby facilitating transfer of a first retentate to the CCM 115. A CCM 115 may be configured to concentrate solid waste products (e.g., a first retentate, a second retentate).

A filtration unit 120 may include an inlet configured to receive a strainer filtrate from strained fluid connector 111, a filtration medium, and one or more outlets. While a strainer 110 may be configured to separate bulk components from a contaminated fluid, a filtration unit 120 includes a filtration medium that may be configured to separate finer particulate materials from a strainer filtrate to generate a filtrate and a second retentate.

A second retentate connector 122 may be configured to fluidly connect filtration unit 120 and a CCM 115, thereby facilitating fluid transfer of a second retentate to the CCM 115. A filtrate connector 121 may be configured to fluidly connect filtration unit 120 and a fixed film biological filter 125 thereby facilitating transfer of a filtrate from filtration unit 120 to the fixed film biological filter 125.

A fixed film biological filter 125 may be configured to receive a filtrate from a filtrate connector 121 and remove microscopic biological contaminants (e.g., bacteria, viruses, fungal spores, bacteriophages, parasites) to generate a permeate. In some embodiments, a permeate may be substantially free from biological contaminants, which can be measured as a biochemical oxygen demand (BOD) of the fluid. A fixed film biological filter 125 may include a filter tank, a packing material, a fixed film biological filter membrane, and one or more filter outlets. Additionally, a fixed film biological filter 125 may transform ammonia gases into nitrate ions. These nitrate ions may be subsequently converted to benign nitrogen gas in other system components. In contrast, existing fluid purification systems generally release ammonia gas into the atmosphere as a greenhouse gas.

As shown in FIG. 1, a permeate connector 126 may be configured to fluidly connect a fixed film biological filter 125 to a permeate tank 130. A permeate connector 126 may be configured to facilitate the transfer of a permeate from a fixed film biological filter 125 to a permeate tank 130. In some embodiments, a permeate tank 130 may include a natural containers (e.g., pond, stream, lake) or a manufactured containers (e.g., mobile storage tanks, stationary tank).

As described above, a CCM 115 may be configured to treat a solid or semi-solid waste (e.g., a first retentate, a second retentate) received from a strainer 110 or a filtration unit 120. In some embodiments, a CCM 115 may be configured to separate a solid or semi-solid waste (e.g., a first retentate, a second retentate) into a third retentate (e.g., a dense wet sludge) and a CCM permeate.

As shown in FIG. 1, a CCM filtrate connector 126 may be configured to fluidly connect a CCM 115 to a fixed film biological filter 125. A CCM filtrate connector 126 may be configured to facilitate transfer of a CCM filtrate from a CCM 115 to a fixed film biological filter 125.

Figure 2:
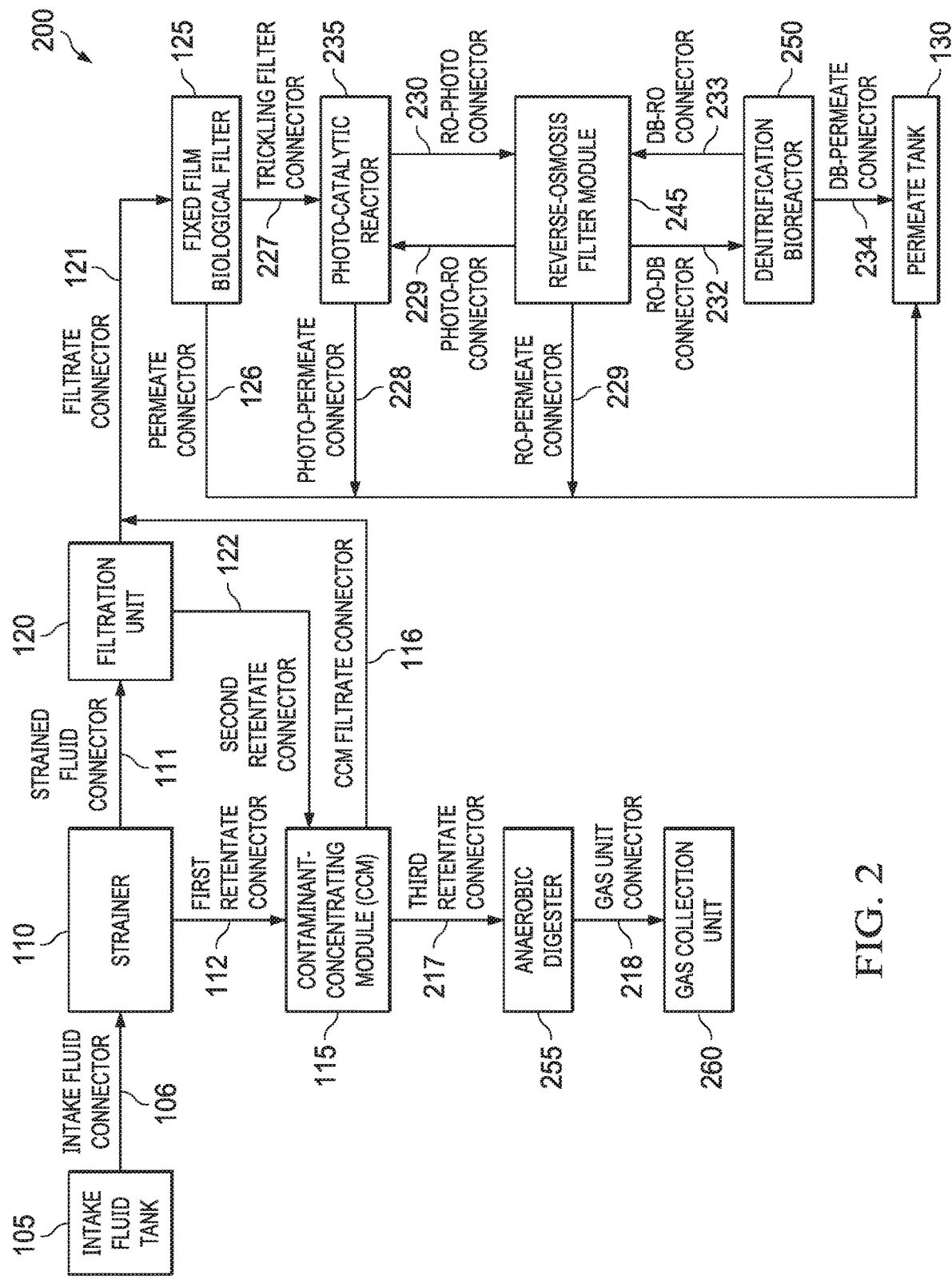
FIG. 2 illustrates a schematic view of a decontamination system for removing contaminants from an intake fluid according to a specific example embodiment of the disclosure.

FIG. 2 illustrates a fluid purification system 200 configured to remove one or more contaminants (e.g., metals) from contaminated fluid according to specific example embodiments of the disclosure. A disclosed system 200 includes an intake fluid tank 105, a strainer 110, a contaminant concentrating module (i.e., a CCM) 115, a filtration unit 120, a fixed film biological filter 125, a permeate stream tank 130, and a series of connectors 106, 111, 112, 122, 121, 116, 126 that are configured to fluidly connect the system components and provide paths for fluid and solid transport as described above; however, system 200 may further include one or more of an anaerobic digester 255, a gas collection unit 260, a photocatalytic reactor 235, a reverse-osmosis filter module 245, a denitrification bioreactor 250, and one or more of an additional series of connectors 217, 218, 227, 228, 229, 230, 231, 232, 233, 234, 236. A disclosed system may include any number of an anaerobic digester 255, a gas collection unit 260, a photocatalytic reactor 235, a reverse-osmosis filter module 245, a denitrification bioreactor 250, and in any order of connectivity. Additionally, a permeate tank 130 can include additional connectors to any system component so that fluid may be transferred from the permeate tank 130 to one or more system component. For example, a permeate could be transferred from permeate tank 130 to one or more of fixed film biological filter 125, photocatalytic reactor 235, reverse-osmosis filter module 245, and denitrification bioreactor 250. In some embodiments, at least one of a fixed film biological filter 125, an anaerobic digester 255, a photocatalytic reactor 235, a reverse-osmosis filter module 245, and a denitrification bioreactor 250, may be fluidly connected to at least one of the fixed film biological filter 125, the anaerobic digester 255, the photocatalytic reactor 235, the reverse-osmosis filter module 245, and the denitrification bioreactor 250 via one or more coupling devices. A coupling device may include one or more of a connector, a conduit, a pipe, and a valve.

As discussed above in reference to FIG. 1, a CCM 115 may be configured to separate a solid or semi-sold waste (e.g., a first retentate, a second retentate) into a third retentate (e.g., a dense wet sludge) and a CCM permeate. As shown in FIG. 2, a third retentate connector 217 may be configured to fluidly connect a CCM 115 to an anaerobic digester 225. A third retentate connector 217 may be further configured to facilitate transfer of the third retentate to the anaerobic digester 225 for biodegradation.

An anaerobic digester 225 may include an anaerobic digester tank and one or more microorganisms capable of biodegrading at least a portion of a third retentate. During the biodegradation process a third retentate may be converted into a benign solid (e.g., nitrogen and/or phosphorous rich fertilizers) and one or more gases (e.g., methane). In some embodiments, an anaerobic digester 225 may be fluidly connected to a gas collection unit 260 through a gas unit connector 218. A gas unit connector 218 may be configured to facilitate transfer of one or more gases from anaerobic digester 225 to a gas collection unit 260.

According to some embodiments, and as illustrated in FIG. 2, some systems may include components configured to further purify a permeate prior to its deposit in a permeate tank 130. For example, in some embodiments a permeate generated by a fixed film biological filter 125 may include trace amounts of one or more salts, chemicals, biological organisms (e.g., bacteria, fungal spores), viruses, or a combination thereof. In some embodiments, a system 200 may include one or more additional treatment units downstream from a fixed film biological filter 125, including a photocatalytic reactor 235, a reverse-osmosis filter module 245, a denitrification bioreactor 250, or any combination thereof.

According to some embodiments, a system may further comprise a trickling filter connector 227 configured to fluidly connect a fixed film biological filter 125 to a photocatalytic reactor 235 and facilitate transfer of a permeate to the photocatalytic reactor. A photocatalytic reactor 235 may include a reaction tank; a UV light source, a titanium dioxide feed stream, titanium dioxide, a photocatalytic reactor membrane, and a titanium dioxide supply tank. In some embodiments, a permeate may include trace and residual chemical and biological components. A photocatalytic reactor 235 may be configured to receive a permeate, combine it with a photocatalyst (e.g., titanium dioxide) to generate a photocatalyst mixture, expose the photocatalyst mixture to UV radiation to generate an exposed photocatalytic mixture, and pass the exposed photocatalytic mixture through a photocatalytic reactor membrane to generate a photocatalytic reactor permeate and a recycled photocatalyst. A recycled photocatalyst may be retained within the photocatalytic reactor 235. The combined photocatalyst and UV light treatment degrades chemical and biological components remaining in the received permeate.

Photocatalytic reactor permeate may be transferred through a connector to one or more of a reverse-osmosis filter module 245 or a permeate stream tank 130. For example, a photo-RO connector 229 and a RO-photo connector 230 may be configured to fluidly connect photocatalytic reactor 235 and reverse-osmosis filter module 245, where the photo-RO connector 229 can facilitate transfer of a permeate from the photocatalytic reactor 235 to the reverse-osmosis filter module 245. Disclosed RO-photo connector 230 can facilitate transfer of a permeate from a reverse-osmosis filter module 245 to a photocatalytic reactor 235. Photo-permeate connector 228 may be configured to fluidly connect photocatalytic reactor 235 and permeate tank 130 thereby facilitating transfer of a permeate from the photocatalytic reactor 235 to the permeate tank 130.

Because a photocatalyst (e.g., titanium dioxide) used in system 200 may be retained within photocatalytic reactor 235, the photocatalyst does not exit the system to create an environmental pollutant. Also, since the photocatalyst can be regenerated during the decontamination process, it is a renewable resource for decontaminating fluids and does not need to be replenished, thereby reducing the environmental impact of system 200. In contrast, existing systems treat fluids with consumable chemicals that degrade chemical and biological contaminants in a limited and non-renewable manner, leading to an increased overall environmental foot print.

Some permeates coming from fixed film biological filters 125 or photocatalytic reactors 235 may include a residual salt composition. In some embodiments, system 200 may include a reverse-osmosis filter module 245 configured to remove salts from a permeate. Reverse-osmosis filter module 245 may be connected through connectors to a photocatalytic reactor 235, denitrification bioreactor 250, a permeate tank 130, or any combination thereof. For example, photo-RO connector 229 and RO-photo connector 230 may be configured to fluidly connect photocatalytic reactor 235 and reverse-osmosis filter module 245, where the photo-RO connector 229 can facilitate transfer of a permeate from the photocatalytic reactor 235 to the reverse-osmosis filter module 245. Disclosed RO-photo connector 230 can facilitate transfer of a permeate from reverse-osmosis filter module 245 to photocatalytic reactor 235. RO-permeate connector 229 may be configured to fluidly connect reverse-osmosis filter module 245 and permeate tank 130 thereby facilitating transfer of a permeate from the reverse-osmosis filter module 245 to the permeate tank 130. RO-DB connector 232 may be configured to fluidly connect reverse-osmosis filter module 245 to denitrification bioreactor 250, thereby facilitating transfer of a permeate from the reverse-osmosis filter module 245 to the denitrification bioreactor 250.

A reverse-osmosis filter module may include a reverse-osmosis filter housing, a high pressure pump, and a semi-permeable membrane and may be configured to remove one or more salts, ions, molecules, and particles from permeate received from at least one of a photocatalytic reactor 235, a denitrification bioreactor 250, and a permeate tank 130. For example, a reverse-osmosis filter module 245 may be configured to receive a photocatalytic reactor permeate and to produce a salt retentate and a reverse-osmosis permeate that is substantially free from salt. The salt can be harvested for other uses and the reverse-osmosis permeate can be transferred to one or more of the photocatalytic reactor 235, denitrification bioreactor 250, and permeate tank 130. In contrast, existing purification systems produce brackish waters that are severely toxic to marine plants and animals.

A gas including nitrates produced by system 200 may be converted into benign gases by a denitrification bioreactor 250, according to some embodiments of the present disclosure. A system 200 may include a denitrification bioreactor 250 in fluid communication with a photocatalytic reactor 235, a reverse-osmosis filter module 245, a permeate stream tank 130, or any combination thereof through one or more connectors. A DB-permeate connector 234 may be configured to fluidly connect a denitrification bioreactor 250 to a permeate tank 130 thereby facilitating transfer of a permeate from the denitrification bioreactor 250 to the permeate tank 130. A DB-RO connector 233 may be configured to fluidly connect denitrification bioreactor 250 to reverse-osmosis filter module 245 thereby facilitating transfer of a permeate from the denitrification bioreactor 250 to the reverse-osmosis filter module 245.

A denitrification bioreactor 250 may include a denitrification housing, a denitrification bioreactor membrane, and a denitrification substrate (e.g., wood chips). Through a microbial facilitated process, a denitrification bioreactor 250 may be configured to aid in reducing the overall carbon footprint through management of gases produced by the system 200. For example, a denitrification substrate includes a carbon source (e.g., a wood chip, a corn cob, a wheat straw), that serves as a colonization substrate for bacteria that break down nitrates contained within a permeate into benign nitrogen gas. Nitrates are unsafe for humans and the environment. A denitrification bioreactor 250 may be configured to receive a permeate and convert at least a portion of the nitrates into nitrogen gas. In contrast, existing purification systems release nitrate containing waters into the environment, leading to negative consequences for humans and aquatic life.

Intake Fluid Tanks

As illustrated in FIGS. 1 and 2, in some embodiments of a system for purifying a contaminated fluid, the contaminated fluid may be transferred from a source to an intake fluid tank 105. An intake fluid tank 105 may be any shape and size. For example, in some embodiments an intake fluid tank 105 may be configured to hold a volume from about 100 mL to about 10,000 L. An intake fluid tank 105 may be configured to have any number of shapes including a sphere, a cylinder, a cuboid, a cone, a hexagonal prism, a pyramid, and combinations thereof. An intake fluid tank 105 can be made of plastic, metal, and combinations thereof. For example, a plastic intake fluid tank 105 can be reinforced by a metal or plastic cage. An intake fluid tank 105 can also be made of metal while having a plastic internal liner (e.g., a fluoropolymer).

In some embodiments, an intake fluid tank 105 may be connected to a strainer 110 through intake fluid connector 106. However, the strainer 110 is not limited to receiving contaminated fluid from the intake fluid tank 105, but can receive contaminated fluid from other sources. Sources of contaminated fluid that can be transferred to a strainer 110, either directly from a source or from an intake fluid tank 105 include, but are not limited to; environmental sources such as ponds, lakes, and rivers and manufacturing sources such as discard water sources. Additionally, sources of contaminated fluid may include other tanks such as one contained on a transport truck that could feed the contaminated fluid to the strainer 110. According to some embodiments, a strainer 110 may receive contaminated fluid from more than one source at a time through multiple intake fluid connectors 106, or directly from a source.

Connectors

A connector such as an intake fluid connector 106, strained fluid connector 111, first retentate connector 112, second retentate connector 122, CCM filtrate connector 116, permeate connector 126, trickling filter connector 227, photo-permeate connector 228, photo-RO connector 229, RO-photo connector 230, RO-DB connector 232, DB-RO connector 233, and DB-permeate connector 234 may include pipes, conduits, and valves such as those used in plumbing operations. A connector can be made from any number of materials including plastics, rubbers, metals, or combinations thereof and can be any shape or size suitable to maintain fluid connection between system components. Connectors may include any gaskets, valves, or other parts necessary to provide and maintain fluid communication between the components. A connector can be made from elastomers that conform to various shapes and sizes such as a rubber hose. A disclosed connector can be a reinforced conduit such as an elastomer reinforced with a metal or plastic conduit.

Strainers

A strainer 110 can vary in type, size, and shape. For example, a strainer 110 may include a basket strainer, a y-strainer, a t-type basket strainer, a simplex basket strainer, a duplex basket strainer, and combinations thereof. Strainer 110 may include multiple strainers used in a series or in parallel. For example, a strainer 110 may include a first strainer configured to separate course materials and a second strainer configured to separate finer materials. A strainer 110 may be stationary or kinetic. For example, a strainer 110 may include a rotation drum strainer having a rotation drum housing; a rotation screen, and a rotation screen guard. A rotation drum housing may include various shapes and sizes, such as those having volume from about 1 L to about 10,000 L, without deviating from the technology described herein. Moreover, a rotation drum housing can have various compositions including any number of polymers (e.g., high density polypropylene), metals (e.g., steel), and combinations thereof.

A strainer 110 may include one or more screens, with each of the screens having a screen opening of a designated size. The selected size of the screen opening of a strainer 110 may permit particle size selection in a strained fluid and may prevent or reduce fouling of downstream system components (e.g., a filtration unit). For example, a strainer 110 may have a screen opening size that results in a strained fluid having a particle size of less than about 8 mm, or less than 6 mm, or less than 5 mm, or less than 4 mm, or less than 3 mm, or less than 2 mm, or less than 1 mm A disclosed example includes reducing membrane face fouling by reducing a solid particle size of a strained fluid to about 2 mm or less before transferring a fluid to a filtration unit 120 having channels with a diameter of about 5 mm. If the particle size was greater than about 5 mm before the fluid was transferred to the filtration unit 120, fouling at the face of the filtration unit 120 could occur.

According to some embodiments, a strainer 110 may include a screen having openings of less than 20 mm, or less than 15 mm, or less than 10 mm, or less than 9 mm, or less than 8 mm, or less than 7 mm, or less than 6 mm, or less than 5 mm, or less than 4 mm, or less than 3 mm, or less than 2 mm, or less than 1 mm, or less than 900 µm, or less than 800 µm, or less than 700 µm, or less than 600 µm, or less than 500 µm. Disclosed screens may include polymers (e.g., high density polypropylene), metal (e.g., steel), natural fibers, and any combination thereof.

Filtration Units

A filtration unit 120 may be configured to remove solid contaminants, solubilized contaminants, or a combination thereof from a strained fluid through gravity mechanisms, pressurized mechanisms, or a combination thereof. For example, a filtration unit 120 may include a ceramic membrane that filters particulate matter based on size exclusion. In some embodiments, a filtration unit 120 may have an affinity based filtration medium such as an ion exchange resin that filters solubilized contaminants based on particle charge. Filtration mediums may include ceramics (e.g., clay), aluminum oxide, titanium dioxide, zirconia, silicon dioxide, and any combination thereof. In some embodiments a filtration medium may have a pore size from 0.001 µm to 10 µm for both ultrafiltration and microfiltration. For example, a ceramic membrane may have a pore size of about 0.001 µm, or of about 0.005 µm, or of about 0.01 µm, or of about 0.02 µm, or of about 0.04 µm, or of about 0.06 µm, or of about 0.08 µm, or of about 0.10 µm, where about includes plus or minus 0.005 µm. Ceramic membranes can be made with binders such a tylose, polypropylene, sodium polyacrylate, polypropylene carbonate, carboxymethylcellulose, starches, dextrin, wax emulsions, lignosulfonates, paraffins, sodium silicate, magnesium aluminum silicates, and bentonite. Binders can provide for different filtering sizes along with enhanced mechanical properties for the ceramic membrane. A filtration unit 120 may include both crossflow (tangential flow) and dead-end filtration.

In some embodiments, a filtration unit 120 may include a ceramic filtration unit, as described in U.S. application number U.S. patent application Ser. No. 14/070,263 (U.S. Pat. No. 10,005,686), filed Nov. 1, 2013, and entitled "Fluid Treatment System," which is incorporated by reference herein.

A filtration unit 120 may include additional components for treating and removing contaminants from contaminated fluid received from a strainer 110. For example, in some embodiments a filtration unit 120 may include an aeration unit, a reactor, a filtration membrane, and a dynamic shock generator. In some embodiments, a filtration unit 120 may combine a strained filtrate with a coagulant (e.g., ferric chloride) configured to precipitate solubilized contaminants that would not otherwise be separable through filtration.

According to some embodiments, an aeration unit may include a compressed gas inlet connected to a dissolved oxygen addition device with a substrate having pores of less than 1 micron in diameter. An aeration unit may receive a strained fluid through an inlet and generate an aerated fluid at a flow rate by releasing the compressed gas through a compressed gas inlet at a pressurized gas rate such that the pressurized gas travels through a substrate, thereby creating bubbles in the strained fluid so that it is aerated. A chemical inlet can be disposed downstream of an aeration unit and may be configured to transfer an additive, including a coagulant and a precipitating agent, into an aerated fluid. An aerated fluid containing an additive may be received by a reactor tank disposed downstream from a chemical inlet. After being retained for a period from about 30 seconds to about 5 minutes, a fluid may be filtered through a filtration membrane (e.g., a ceramic membrane) and disposed downstream of and in fluid communication with a reactor tank to generate a treated fluid. A filtrate may be transferred through filtrate connector 121 to fixed film biological filter 125, as shown in FIG. 2.

A precipitating agent may include calcium hydroxide, sodium hydroxide, potassium hydroxide, and combinations thereof. A coagulant may include alum (aluminum sulfate), ferric chloride, ferric sulfate, polyaluminum chloride (PAC), aluminochloro-30-hydrate (ACH), bentonite clay, aluminum chloride, ferrous sulfate. A disclosed coagulant and precipitating agent can promote metal oxidation, reduction, chemical precipitation, and chemical coagulation of dissolved or partially dissolved contaminants to aid in the removal of contaminants from a strained fluid received from a strained fluid connector 111.

A filtration unit 120 may also include a dynamic shock generator configured to provide a ceramic membrane of a filtration unit with a dynamic shock to defoul the ceramic membrane. A dynamic shock received from a dynamic shock generator may travel through a fluid or through a membrane itself to separate a foulant from a porous membrane.

Fluid purification may include filtration of a fluid stream (e.g., a screened fluid stream) by a filtration unit 120. A filtration unit 120 may be advantageously configured to remove substantially all solubilized contaminants. In some embodiments, a filtration unit 120 may be advantageously configured to remove a partial portion of solubilized contaminants. A fluid output stream from a filtration unit 120 may comprise substantially less solubilized contaminants relative to an initial fluid intake stream. In some embodiments, utilization of a small dose of coagulant may facilitate removal of solubilized contaminants. For example, a disclosed filtration unit 120 may remove greater than about 50% of solubilized contaminants, or greater than about 55% of solubilized contaminants, or greater than about 60% of solubilized contaminants, or greater than about 65% of solubilized contaminants, or greater than about 70% of solubilized contaminants, or greater than about 75% of solubilized contaminants, or greater than about 80% of solubilized contaminants, or greater than about 85% of solubilized contaminants, or greater than about 90% of solubilized contaminants, or greater than about 95% of solubilized contaminants, or greater than about 99% of solubilized contaminants, from the received filtrate, where about includes plus or minus 5%.

Fixed Film Biological Filters

A fixed film biological filter 125 may be configured to reduce biological contaminants from a contaminated fluid (e.g., a filtrate). As shown in FIGS. 1 and 2, filtrate connector 121 may be configured to fluidly connect filtration unit 120 to fixed film biological filter 125, thereby facilitating transfer of a filtrate from the filtration unit 120 to the fixed film biological filter 125. CCM filtrate connector 116 may be configured to fluidly connect CCM 115 to filtration unit 120, thereby facilitating transfer of a filtrate from CCM 115 to filtration unit 120.

A fixed film biological filter 125 may include a biological filter tank, one or more packing materials, a biological filter membrane, and one or more outlets. A biological filter tank may be configured so that filtrate received is contained within, may contact a packing material, pass through a biological filter membrane, and exit the biological filter tank through an outlet connecting to trickling filter connector 227 or permeate connector 126. A biological filter membrane may be set up in a cross-flow or dead-end flow filtration configuration. In some embodiments, a biological filter membrane may be configured to retain packing materials within a biological filter tank so that filtrate can pass through the biological filter tank without removing packing materials from the biological filter tank.

In some embodiments, a packing material may include rocks, gravel, lava, coke, polyurethane foam, sphagnum peat moss, ceramics, polymers, pumice, sand, and combinations thereof. A packing material may be chosen to optimize fluid retention time and biological contaminant reduction. A fixed film biological filter membrane can be made from any number of polymeric, ceramic, or metal materials. For example, a fixed film biological filter membrane may include a polymer selected from polysulfone, polyethylene, polytetrafluoroethylene, polypropylene, vinyl polymers, polyurethanes, and copolymers thereof. In some embodiments, a fixed film biological filter membrane may include a ceramic selected from silicon carbide, tungsten carbide, alumina, silica, and combinations thereof. According to some embodiments, a fixed film biological filter membrane may include a metal selected from aluminum, brass, copper, and stainless steel.

A fixed film biological filter 125 may include trickling filters, biologically activated carbon (BAC) filters, or a combination thereof. In some embodiments, a fixed film biological filter 125 may be configured to oxidize ammonia into nitrate ions. Ammonia may be generated in a filtration unit 120, a CCM 115, or combinations thereof and transferred to a fixed film biological filter 125 through filtrate connector 121 or CCM filtrate connector 116.

In some embodiments, fluid treated by a fixed film biological filter 125 may have little to no suspended solids since it has been filtered by a filtration unit 120. As a result, a fixed film biological filter 125 is unlikely to foul due to plugging. In some embodiments, a fixed film biological filter 125 may not have to remove or consume colloidal organic material. A fixed film biological filter 125, in some embodiments, may remove or consume dissolved organics, ammonia, or combinations thereof.

A fixed film biological filter 125 may be configured to separate at least a portion of the fixed film biological filter intake fluid into a fixed film biological filter recovered particulate and a permeate. A permeate may be substantially free from biological contaminants. Aerobic biological contaminant concentrations can be measured through measuring the biochemical oxygen demand (BOD) of the fluid. Therefore, a fixed film biological filter 125 may generate permeate having substantially reduced BOD values in comparison to the BOD value of the incoming filtrate or CCM filtrate. For example, a permeate may have a BOD of about 0 ppm. In some embodiments, a permeate may comprise a BOD of less than about 100 ppm, or of less than about 75 ppm, or of less than about 50 ppm, or of less than about 40 ppm, or of less than about 30 ppm, or of less than about 20 ppm, or of less than about 10 ppm, or of less than about 5 ppm, or of less than about 1 ppm, with about including plus or minus 1 ppm. The permeate that comprises about 0 BOD may advantageously comprise substantially no aerobic biological organisms.

A fixed film biological filter 125 may reduce a chemical oxygen demand from a fluid (COD). COD is a measure of the capacity of water to consume oxygen during the decomposition of organic matter and the oxidation of inorganic chemicals (e g, ammonia, nitrite). In some embodiments, a permeate may comprise substantially no COD. For example, a permeate may comprise a COD of less than about 1000 ppm, less than about 750 ppm, less than about 500 ppm, less than about 400 ppm, less than about 300 ppm, less than about 200 ppm, less than about 100 ppm, less than about 50 ppm, or less than about 10 ppm, with "about" being plus or minus 10 ppm.

In some embodiments, a permeate may comprise a BOD of less than about 5 ppm and a COD of less than about 1 ppm. A permeate having a reduced COD and a reduced BOD can be transferred to permeate stream tank 130 through permeate connector 126. In some embodiments, a permeate having a reduced COD and a reduced BOD can be transferred to photocatalytic reactor 235 through trickling filter connector 227.

Contaminant Concentrating Modules (CCM)

A contaminant-concentrating module 115 is configured to dewater a first retentate received from strainer 110 and filtration unit 120 to form a second retentate (i.e., a wet sludge) and a CCM permeate. A contaminant concentrating module (CCM) 115 includes a housing tank, a porous membrane, and a permeate collection means. A housing tank contains a porous membrane and a permeate collection means. Retentate received from strainer 110 and filtration unit 120 may enter a housing tank and contact a porous membrane so that a third retentate may collect on the porous membrane to form a third retentate. A permeate collection means may retrieve collected third retentate from a porous membrane to be removed from a housing tank. For example, once a third retentate has sufficiently collected onto a porous membrane, the porous membrane may be temporarily removed from a housing tank so that the third retentate may disengage the porous membrane and collect onto a conveyor belt or pass through third retentate connector 217. Once a third retentate has disengaged a porous membrane, the porous membrane may be placed back into a housing tank to collect more retentate. Porous membranes may be placed vertically or horizontally in a housing tank. In some embodiments, porous membranes are configured for cross-flow filtration or dead-end filtration.

A housing can be any shape or size and composed of any suitable material (e.g., metal, plastic) capable of supporting a porous membrane. A porous membrane may include one or more ceramic membranes having a pore size from 0.004 μm to 10 μm. In some embodiments, a ceramic membrane may include ceramics composed of one or more carbides (e.g., silicon carbide), oxides (e.g., aluminum oxide), nitrides (e.g., silicon nitride), or combinations thereof. During the manufacture of a CCM porous membrane, binders can be used to improve mechanical and contaminant affinity. In some embodiments, a binder may include tylose, polypropylene, sodium polyacrylate, polypropylene carbonate, carboxymethylcellulose, starches, dextrin, wax emulsions, lignosulfonates, paraffins, sodium silicate, magnesium aluminum silicates, and bentonite. A CCM porous membrane may include both crossflow and dead-end filtration, according to some embodiments. Additionally, to prevent fouling of a CCM porous membrane, a CCM 115 may include a dynamic shock generator configured to pulse the CCM porous membrane with a dynamic shock to defoul the membrane.

In some embodiments, a CCM retentate may be separated from a CCM permeate, the retentate may settle into a contaminant trap positioned below a CCM porous membrane and form a contaminant trap slug. A contaminant trap slug can be manually or mechanically removed from the CCM 115 for disposal or further treatment (e.g., anaerobic digestion). Additionally, as shown in FIG. 2, a contaminant trap slug can be transferred to the anaerobic digester 255 to be biodegraded into fertilizers. In some embodiments, as shown in FIG. 2, a third retentate can be transferred to the anaerobic digester 255 to be biodegraded into fertilizers.

Anaerobic Digesters

As shown in FIG. 2, a third retentate may be transferred from the CCM 115 to anaerobic digester 225 through a third retentate connector 217. An anaerobic digester 225 may receive a second retentate directly from a filtration unit 120 and a first retentate directly from a strainer 110. An anaerobic digester 225 may biodegrade at least one of a first, a second retentate, and a third retentate to produce a digestate and gas. Biodegradation within an anaerobic digester 225 is performed by microorganisms that biodegrade contaminant material in the absence of oxygen (e.g., bacteria). During the biodegradation process one or more gases may be produced and collected by gas collection unit 260. The one or more gases may include methane, carbon dioxide, nitrogen, hydrogen, hydrogen sulfide, oxygen, and any combination thereof. Utilization of an anaerobic digester 225 may advantageously reduce the overall carbon footprint of a decontamination system by collecting and storing one or more greenhouse gases (e.g., methane, carbon dioxide) that would otherwise have been released into the environment. Additionally, a digestate can be used as a fertilizer, thereby producing solid byproducts with a beneficial use.

Within an anaerobic digester 225, bacteria (e.g., homoacetogens) may digest organic material (e.g., contaminants) by converting organic polymers such as carbohydrates and protein into carbon dioxide, hydrogen, nitrogen ammonia, and organic acids. Other bacteria present may further degrade the ammonia and organic acids produced. For example, other bacteria including methanogens (e.g., methanobacterium) can convert ammonia, and organic acids into methane, nitrogen, and carbon dioxide that can be collected in gas tanks.

Besides producing gases, an anaerobic digester 225 can convert a retentate (e.g., a first retentate, a second retentate, a third retentate) received from the CCM 115 into a digestate that can be used as a fertilizer. For example, acidogenic bacteria may produce an acidogenic digestate including a fibrous matter such as lignin and cellulose that may contain minerals. Bacteria such as a methanobacterium may produce a methanogenic digestate that contains nutrients such as ammoniums and phosphates.

A disclosed anaerobic digester 255 may include an anaerobic digester tank configured to contain one or more of a first retentate, a second retentate, and a third retentate along with a microorganism. Anaerobic digester tanks are sealed, airtight tanks that may contain mixers to evenly distribute microorganisms throughout the anaerobic digester tank contents including a third retentate. Mixers include propellers that may extend from any surface of an anaerobic digester tank and extend into the contents of the anaerobic digester tank.

Digestate produced by a microorganism contained in an anaerobic digester tank can be transferred from the anaerobic digester tank to solid or liquid digestion product collection tanks. For example, a digestate (e.g., livestock bedding, compost, fertilizer, nutrients) produced by or within an anaerobic digester tank can be transferred to a digestion product collection tank. Gases produced within an anaerobic digester tank may be transferred to gas collection unit 260 through gas unit connector 218.

Disclosed anaerobic digester may biodegrade greater than about 50% of the contaminants, or greater than about 55% of the contaminants, or greater than about 60% of the contaminants, or greater than about 65% of the contaminants, or greater than about 70% of the contaminants, or greater than about 75% of the contaminants, or greater than about 80% of the contaminants, or greater than about 85% of the contaminants, or greater than about 90% of the contaminants, or greater than about 95% of the contaminants, or greater than about 99% of the contaminants, where about includes plus or minus about 5%.

As shown in FIG. 2, anaerobic digester 255 may be connected to gas collection unit 260 through gas unit connector 218. A byproduct of decomposing contaminants from a third retentate within an anaerobic digester 255 is one or more gases (e.g., methane) produced by a microorganism. A gas can be transferred from the anaerobic digester 255 to a gas collection tank within a gas collection unit 260 through gas unit connector 218. Gas collection units include a gas tank and a compressor. As gases are produced by anaerobic digester 255, gases travel through gas unit connector 218 such as a pipe or conduit to a gas collection unit 260, wherein a compressor is configured to pressurize and collect the gas into the gas tank. Collection of the one or more gases generated by an anaerobic digester decreases the environmental impact of the decontamination system by limiting the release of gases (e.g., greenhouse gases) into the atmosphere. The stored gases can be used to make additional products.

Photocatalytic Rectors

A fluid purification system 200 may include a photocatalytic reactor 235, as shown in FIG. 2, configured to degrade residual chemical and/or biological components of a permeate, a reverse-osmosis permeate, a reduced nitrogen permeate, or any combination thereof. A photocatalytic reactor 235 may include a photocatalytic reactor tank, a UV light source, a titanium dioxide feed stream, titanium dioxide, a photocatalytic reactor membrane, and a titanium dioxide supply tank. In some embodiments, photocatalytic reactor tanks may be configured to house, support, or envelope a UV light source, titanium dioxide, and a photocatalytic reactor membrane. A photocatalytic reactor tank may be connected to a titanium dioxide supply tank that is configured to supply titanium dioxide to the photocatalytic reactor tank. In some embodiments, a titanium dioxide supply tank may be housed exterior to a photocatalytic reactor tank. For example, a titanium dioxide supply tank may be oriented on the outside of a photocatalytic reactor tank, wherein the titanium dioxide supply tank may supply titanium dioxide to the photocatalytic reactor tank. A UV light source that can be housed inside of or outside of a photocatalytic reactor tank can provide a steady or varying stream of electromagnetic radiation at various wavelengths for any duration of time. For example, a UV light source can provide electromagnetic radiation at a wavelength from about 10 nm to about 400 nm. Besides titanium dioxide, the photocatalytic reactor can include additional photocatalysts such as $ZnO$, $SnO_2$, and $ZrO_2$.

In some embodiments, a photocatalytic reactor 235 may apply UV light to a portion of a permeate received from the fixed film biological filter 125 or a reverse-osmosis filter module 245 or a denitrification bioreactor 250, wherein a UV light may degrade chemical or biological components. For example, biological components may be rendered inert and chemical components may decompose, oxidize, reduce, or aggregate.

As shown in FIG. 2, a photocatalytic reactor 235 may be in fluid communication with a fixed film biological filter 125, a reverse-osmosis filter module 245, a denitrification bioreactor 250, and a permeate stream tank 130. For example, an inlet of a photocatalytic reactor may receive at least a portion of a permeate and to expose the permeate to UV light and titanium dioxide to form a photocatalytic reactor permeate and a recycled photocatalyst. A photocatalytic reactor may be configured to separate at least a portion of a photo-exposed fluid into a titanium dioxide recycle stream and a photocatalytic reactor permeate that is substantially free from a photocatalyst (e.g., titanium dioxide). For example, a photocatalytic reactor permeate may include less than about 10% of a photocatalyst MB, or less than about 9% of the photocatalyst MB, or less than about 8% of the photocatalyst MB, or less than about 7% of the photocatalyst MB, or less than about 6% of the photocatalyst MB, or less than about 5% of the photocatalyst MB, or less than about 4% of the photocatalyst MB, or less than about 3% of the photocatalyst MB, or less than about 2% of the photocatalyst MB, or less than about 1% of the photocatalyst MB, where about includes plus or minus 0.5%.

Reverse-Osmosis Filters

In some embodiments, a fluid purification system 200 may include a reverse-osmosis filter module 245 as shown in FIG. 2. A reverse-osmosis filter module 245 can remove salts, bacteria, molecules, and particles from fluids. Salts that can be removed by reverse-osmosis filter modules 245 include those having cations including sodium, lithium, calcium, magnesium, and potassium, and having anions including chloride, sulfate, bicarbonate, carbonate, and nitrate. Reverse-osmosis filter modules comprise reverse-osmosis filter housing, high pressure pumps, and semipermeable membranes to remove ions, molecules, and larger particles from a fluid. Reverse-osmosis filter modules 245 include a reverse-osmosis tank and a reverse-osmosis membrane, wherein the reverse-osmosis tank may be configured to support, contain, or envelop the reverse-osmosis membrane. Semi-permeable membranes can have a pore size ranging from 0.1 to 5 nm.

A reverse-osmosis filter module 245 may be configured to receive at least a portion of the permeate, such as from the photocatalytic reactor 235, and to separate it into a reverse-osmosis concentrate and a reverse-osmosis permeate. For example, a reverse-osmosis filter module 245 may be configured to receive permeate from and be in fluid communication with a fixed film biological filter 125, a photocatalytic reactor 235, a denitrification bioreactor 250, and a permeate stream tank 130. Additionally, a fixed film biological filter 125 may be in fluid communication with a photocatalytic reactor 235, a reverse-osmosis filter module 245, a denitrification bioreactor 250, and a permeate stream tank 130.

A reverse-osmosis filter module 245 may be configured to receive at least a portion of the permeate and produce a reverse-osmosis permeate with less than about 50% of a salt mass basis (MB), or less than about 45% of the salt MB, or less than about 40% of the salt MB, or less than about 35% of the salt MB, or less than about 30% of the salt MB, or less than about 25% of the salt MB, or less than about 20% of the salt MB, or less than about 15% of the salt MB, or less than about 10% of the salt MB, or less than about 5% of the salt MB, or less than about 1% of the salt MB, where about includes plus or minus 0.5%.

Disclosed reverse-osmosis filters modules 245 can receive a permeate and remove at least about 50% of salts, or at least about 55% of salts, or at least about 60% of salts, or at least about 65% of salts, or at least about 70% of salts, or at least about 75% of salts, or at least about 80% of salts, or at least about 85% of salts, or at least about 90% of salts, or at least about 95% of salts, or at least about 99% of salts, from the permeate, where about includes plus or minus 5%.

Denitrification Bioreactors

Figure 3:
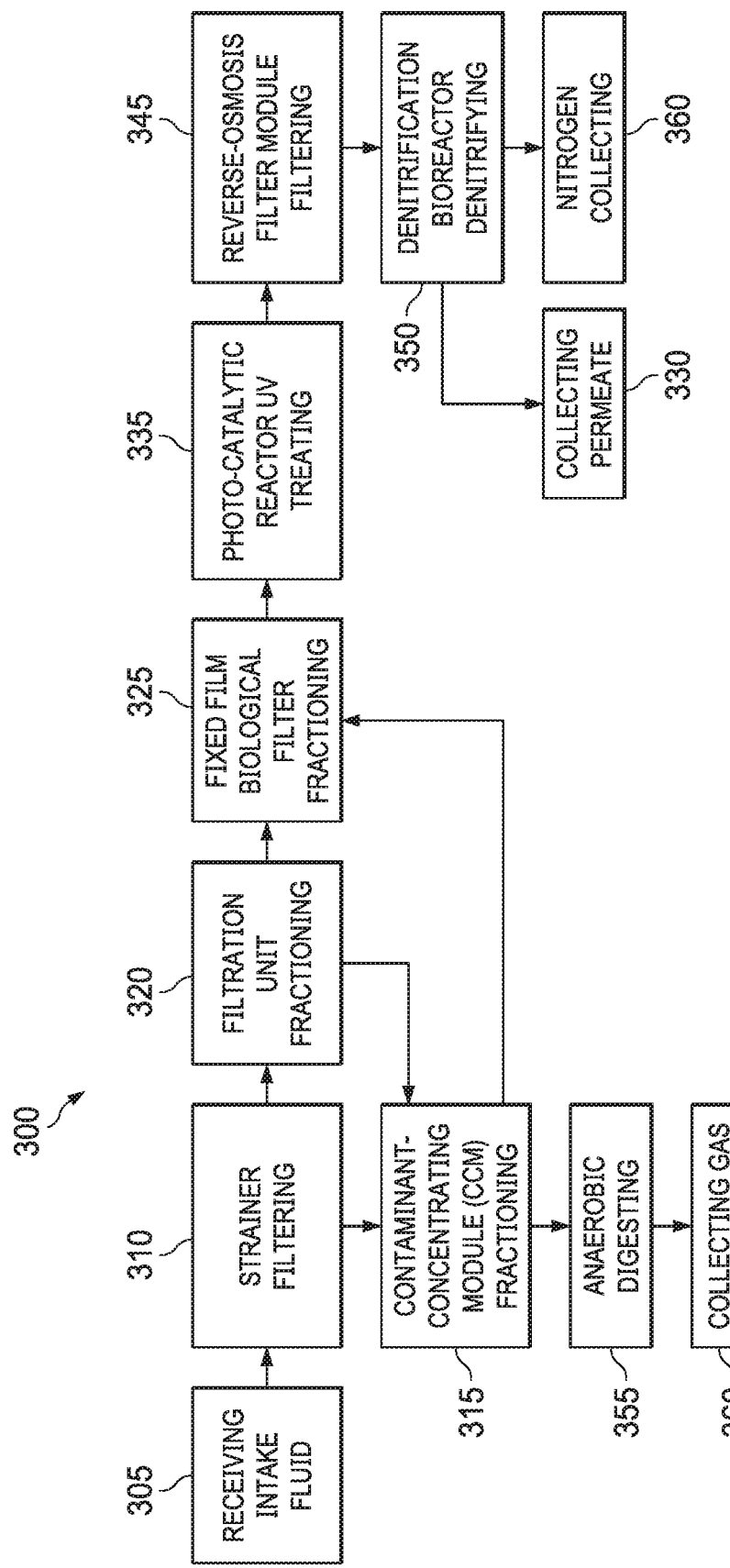
FIG. 3 illustrates a flow diagram of a method for removing contaminants from an intake fluid according to a specific example embodiment of the disclosure.

In some embodiments, as shown in FIGS. 2 and 3, a fluid purification system 200 may include a denitrification bioreactor 250. As described above, denitrification includes microbial facilitated processing of nitrate contained within a fluid to reduce the nitrate to benign molecular nitrogen. For example, a denitrification bioreactor 250 may convert substantially all nitrate of the fluid into nitrogen gas. Nitrogen gas produced by a denitrification bioreactor 250 can be released into the atmosphere or collected in a gas tank. This reduces the overall carbon footprint of the system 200 by reducing potentially ozone depleting substances and greenhouse gases comprising nitrate, nitrite, ammonia, ammonium, nitric oxide, nitrous oxide, and combinations thereof.

Denitrification housing may comprise an open container and a closed container. Denitrification housing can partially or substantially surround, support, or contain a denitrification bioreactor membrane and wood chips. Disclosed denitrification housing can be made from metal, polymers, and dirt. For example, the denitrification housing can be a soil or dirt based trench. Denitrification housing can also be a metal container. A denitrification bioreactor may be lined with a denitrification bioreactor membrane that supports or envelops wood chips. For example, a denitrification bioreactor can include a soil or dirt trench supporting the denitrification bioreactor membrane, wherein the denitrification bioreactor membrane supports wood chips and partially or substantially prevents contact from the wood chips to the soil or dirt. Filtrate received by a denitrification housing is introduced to wood chips, but the filtrate is separated from leaving the denitrification housing by a denitrification bioreactor membrane. Some embodiments of the present disclosure may provide for effective conversion of organic phosphorus to inorganic phosphorus. For example, disclosed denitrification bioreactors 250 can cover greater than about 50% of organic phosphorous to inorganic phosphorous, or greater than about 60%, or greater than about 70%, or greater than about 80%, or greater than about 90%, or greater than about 95%, where about includes plus or minus 5%. Denitrification bioreactors 250 can reduce a nitrate concentration of a fluid to less than about 50% mass basis (MB), or less than about 40% MB, or less than about 30% MB, or less than about 20% MB, or less than about 10% MB, or less than about 5% MB, or less than about 4% MB, or less than about 3% MB, or less than about 2% MB, or less than about 1% MB, where about includes plus or minus 0.5% MB.

Denitrification bioreactors 250 can reduce the organic phosphorous concentration of a fluid to less than about 50% mass basis (MB), or less than about 40% MB, or less than about 30% MB, or less than about 20% MB, or less than about 10% MB, or less than about 5% MB, or less than about 4% MB, or less than about 3% MB, or less than about 2% MB, or less than about 1% MB, where about includes plus or minus 0.5% MB.

Additionally, basic wood chips may denitrify nitrate if polishing of nitrate is desired. A denitrification bioreactor 250 may be configured to receive at least a portion of the fluid from various system 200 components and to convert substantially all nitrate to nitrogen gas. For example, a denitrification bioreactor 250 can be connected through a connector to a fixed film biological filter 125, a photocatalytic reactor 235; and a reverse-osmosis filter module 245, receive fluid from any one of these components, and convert substantially all nitrate to nitrogen by reducing nitrate concentration to less than about 1% MB.

Methods

FIG. 3 illustrates a method 300 for treating intake fluids having a contaminant while minimizing the overall environmental footprint of the method. Disclosed methods 300 incorporate system components as described above and referenced in FIGS. 1 and 2. In some embodiments, a method 300 may include receiving an intake fluid 305 in an intake fluid tank and straining the intake fluid with a strainer 110 to form a first retentate and a strained filtrate 310. A method 300 may include filtering the strained filtrate with a filtration unit 120 to form a second retentate and a filtration unit filtrate 320. A disclosed method may include filtering a filtration unit filtrate with a fixed film biological filter to form a permeate 325, where the permeate has a reduced biological oxygen demand A method 300 may include treating a permeate with UV radiation 335 in a photocatalytic reactor 235. A permeate may be received from one or more of a fixed film biological filter 125, a permeate tank 130, a reverse-osmosis filter module 245, and a denitrification bioreactor 250. In some embodiments, a method 300 includes removing salts from a permeate 345 with a reverse-osmosis filter module 245. In some embodiments a method may include removing salts from a permeate 345 received from one or more of a fixed film biological filter 125, a permeate tank 130, a photocatalytic reactor 235, and a denitrification bioreactor 250.

A method 300 for treating intake fluids may include a step of denitrifying a permeate 350 with a denitrification bioreactor 250. Denitrifying a permeate 350 may be performed on permeate received from one or more of a fixed film biological filter 125, a permeate tank 130, a photocatalytic reactor 235, and a reverse-osmosis filter module 245. In some embodiments, nitrogen produced by through denitrifying a permeate 350 may be collected through a step of nitrogen collecting 360 in a gas tank.

Disclosed method 300 includes a step of contaminant concentrating module fractioning 315 that may separate one or more of a first retentate and a second retentate into a third retentate and a CCM 115 permeate. A method 300 may include a step of anaerobic digesting 355 a retentate (e.g., a first retentate, a second retentate, a third retentate, or any combination thereof) to produce a digestate and a gas (e.g., nitrogen). In some embodiments, a method 300 may include a step of collecting gas 360 formed by an anaerobic digester 255 in a gas collection unit 260. According to some embodiments, a method 300 may includes a step of collecting permeate 330 that is substantially free from a contaminant. Collecting permeate 330 may include collecting a permeate in a permeate tank 130.

Contaminated and Decontaminated Waters

The present disclosure relates, in some embodiments, to systems and methods of removing contaminants from an intake fluid (e.g., contaminated water). A contaminant may include pathogens, chemicals, gases, biologics, and solid materials. For example, a pathogen may comprise a virus (e.g., norovirus), a bacteria (e.g., *Burkholderia pseudomallei* and *Salmonella*), a parasite (e.g., ancylostoma and trichuris), a protozoa (e.g., *Giardia* lamblia) and combinations thereof. A chemical may include heavy metals (e.g., chromium, cadmium, arsenic, mercury, and lead), halogenated solvents, salts (e.g., nitrates), pesticides, herbicides, petroleum, perchlorate, drug pollution, detergents, volatile organic compounds, and combinations thereof. A solid material may include dirt, polymers, macro-solids (e.g., sanitary napkins and diapers), food, sewage, and combinations thereof. A gas may include hydrogen sulfide, carbon dioxide, methane, oxygen, and combinations thereof. Presently disclosed systems and methods of removing a contaminant from an intake fluid may produce a permeate from a contaminated fluid.

A permeate (e.g., may be potable. A disclosed permeate may be used for industrial uses such as the semiconductor and pharmaceutical industries. A permeate may be substantially free from pathogens, chemicals, gases, biologics, and solid materials. For example, a permeate may have an electrical conductivity of not more than about 11 $\mu$S/cm and a total dissolved solids of less than about 10 mg/L. Permeate may have a conductivity from about 5 mS/m to about 50 mS/m. Permeate may have a resistivity of about 18 Mohm·cm at 25° C. Permeate may have had almost all of its mineral ions removed, such as cations (e.g., sodium, calcium, iron, copper) and anions (chloride, nitrate, sulfate). Permeate may have a pH from about 5.0 to about 7.5, or from about 4.0 to about 8.0, or about 3.0 to about 9.0, where about includes plus or minus 1.0.

In some embodiments, permeate may include substantially no nitrates. For example, permeate may include a nitrate concentration of less than about 100 ppm, or less than about 75 ppm, or less than about 50 ppm, or less than about 25 ppm, or less than about 10 ppm, or less than about 5 ppm, or less than about 1 ppm, where about includes plus or minus 0.5 ppm. A permeate may have a biochemical oxygen demand (BOD) of about 0 ppm. For example, a permeate may have a BOD of less than about 100 ppm, or less than about 75 ppm, or less than about 50 ppm, or less than about 40 ppm, or less than about 30 ppm, or less than about 20 ppm, or less than about 10 ppm, or less than about 5 ppm, or less than about 1 ppm, where about includes plus or minus 0.5 ppm. In some embodiments, permeate that comprises substantially no BOD may advantageously have substantially no aerobic biological organisms. Permeate may comprise substantially no chemical oxygen demand (COD). For example, permeate may comprise a COD of less than about 1000 ppm, or less than about 750 ppm, or less than about 500 ppm, or less than about 400 ppm, or less than about 300 ppm, or less than about 200 ppm, or less than about 100 ppm, or less than about 50 ppm, or less than about 10 ppm, where about includes plus or minus 5 ppm. In some embodiments, permeate may include substantially no ammonia. For example, permeate may include an ammonia concentration of less than about 100 ppm, or less than about 75 ppm, or less than about 50 ppm, or less than about 40 ppm, or less than about 30 ppm, or less than about 20 ppm, or less than about 10 ppm, or less than about 5 ppm, or less than about 1 ppm, where about includes plus or minus 0.5 ppm.

By having substantially no COD, permeate produced by disclosed systems includes substantially no chemicals including metals, small organic compounds, and solvents. For example, a permeate may comprise at least one of less than about 4.0 ppm chloramines, less than about 4.0 ppm of chlorine, less than about 0.8 ppm of chlorine dioxide, less than about 0.006 ppm of antimony, less than about 0.01 ppm of arsenic, less than about 2 ppm of barium, less than about 0.005 ppm of cadmium, less than about 0.2 ppm of cyanide, less than about 4 ppm of fluoride, less than about 0.015 ppm of lead, less than about 0.002 ppm of mercury, less than about 10 ppm of nitrate, less than about 1 ppm of nitrite, less than about 0.05 ppm of selenium, less than about 0.002 ppm of thallium, a pH from about 6.5 to about 8.5, less than about 0.005 ppm of benzene, less than about 0.005 ppm of carbon tetrachloride, less than about 0.005 ppm of halogenated organic compounds, and less than about 1 ppm of toluene. Permeate may comprise at least one of less than about 0.2 ppm of aluminum, less than about 250 ppm of chloride, less than about 1.0 ppm of copper, less than about 0.5 ppm of foaming agents, less than about 0.3 ppm of iron, less than about 250 ppm of sulfate, less than about 500 ppm of total dissolved solids, a pH from about 6.5 to about 8.5, and less than about 5 ppm of zinc.

The present disclosure may also provide for permeate without the need for biochemical oxidation and subsequent clarification, bio-solid removal, and/or sludge handling. For example, water suitable for municipal use may be achieved without biochemical oxidation and sludge handling. As another example, potable water may be achieved without biochemical oxidation and sludge handling. Producing such permeate without the need for biochemical oxidation and sludge handling may advantageously reduce carbon footprint and may lessen overall environmental impact. Further, the disclosed systems and methods may also reduce or remove the need for maintaining high dissolved oxygen levels for biochemical oxidation. Corresponding costs for maintaining high dissolved oxygen levels may also be reduced or removed.

As will be understood by those skilled in the art who have the benefit of the instant disclosure, other equivalent or alternative devices, methods, and systems for removing a contaminant from an intake fluid can be envisioned without departing from the description contained herein. Accordingly, the manner of carrying out the disclosure as shown and described is to be construed as illustrative only.

Persons skilled in the art may make various changes in the shape, size, number, and/or arrangement of parts without departing from the scope of the instant disclosure. For example, the position and number of inlets, apertures, filters, gaskets, valves, pumps, sensors, and/or outlets may be varied. In some embodiments, filters, seal gaskets, and/or filtration assemblies may be interchangeable. Interchangeability may allow the size and/or kind of contaminates to be custom adjusted (e.g., by varying or selecting the pore size and/or kind of filter used). In addition, the size of a device and/or system may be scaled up (e.g., to be used for high throughput commercial and municipal fluid filtration applications) or down (e.g., to be used for lower throughput household and research applications) to suit the needs and/or desires of a practitioner. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure. For example, a composition, device, and/or system may be prepared and or used as appropriate for animals and/or humans (e.g., with regard to sanitary, infectivity, safety, toxicity, biometric, and other considerations). Elements, compositions, devices, systems, methods, and method steps not recited may be included or excluded as desired or required.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value+/−about 10%, depicted value+/−about 50%, depicted value+/−about 100%) and/or a range endpoint. With respect to the former, a value of 50 depicted in an example, table, and/or drawing may form the basis of a range of, for example, about 45 to about 55, about 25 to about 100, and/or about 0 to about 100. Disclosed percentages are weight percentages except where indicated otherwise.

All or a portion of a device and/or system for removing a contaminant from an intake fluid may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

EXAMPLES

Some specific example embodiments of the disclosure may be illustrated by one or more of the examples provided herein.

Example 1: Bench Test Data on Sewage Water Treatment

A five gallon sample of raw sewage was retrieved from a sewage treatment plant in London, Ontario and was treated and tested on the same day. Prior to treatment, aliquots were taken and analyzed to provide the untreated control data that is referenced in Tables 1 and 2 as influent. Aliquots of the raw sewage were then treated using two different methods. The first method involved treating a first aliquot with a filtration unit having a reactor tank, a ceramic membrane, and a dynamic shock generator. The second method involved treating a second aliquot with the filtration unit from method one with the addition of $FeCl_3$ being added into the reactor tank and permitted to react for three minutes. Then, the treated aliquots were analyzed for TSS, BOD, phosphorous, phosphate, ammonia, and UV transmittance % (UVT). Examples of results are illustrated below in Tables 1 and 2.

TABLE 1

Bench Test A

| Parameter | Influent | Filtration Unit | $FeCl_3$ + Filtration Unit |
|---|---|---|---|
| TSS | 243 | <3 | <3 |
| BOD | 197 | 33 | 34 |
| Total Phosphorus | 7.5 | 0.74 | 0.29 |
| Phosphate | 1.46 | 0.58 | 0.15 |
| Ammonia | 17.9 | 17.6 | 18.5 |
| UVT (%) |  | 60.7 | 65.2 |

All units are mg/L unless noted.

TABLE 2

Bench Test B

| Parameter | Influent | Filtration Unit | $FeCl_3$ + Filtration Unit |
|---|---|---|---|
| TSS | 139 | <3 | <3 |
| BOD | 156 | 51 | 51.3 |
| Total Phosphorus | 4 | 0.75 | 0.58 |
| Phosphate | 1.65 | 0.56 | 0.43 |
| Ammonia | 35.5 | 34.7 | 34.9 |
| UVT (%) |  | 48.4 | 52.2 |
| Turbidity (NTU) | 92.11 | 1.82 | 1.14 |

All units are mg/L unless noted.

What is claimed is:

1. A system for treating a municipal intake fluid comprising a contaminant, the system comprising:
   (a) a strainer configured to receive the municipal intake fluid and separate the municipal intake fluid into a first retentate and a strained filtrate;
   (b) a filtration unit connected to the strainer through a strained fluid connector, the strained fluid connector configured to facilitate transfer of the strained filtrate from the strainer to the filtration unit, wherein the filtration unit is configured to separate the strained filtrate into a second retentate and a filtration unit filtrate;
   (c) a fixed film biological filter connected to the filtration unit through a filtrate connector, the filtrate connector configured to facilitate transfer of the filtration unit filtrate from the filtration unit to the fixed film biological filter, wherein the fixed film biological filter is configured to reduce a biological oxygen demand of at least one of the filtration unit filtrate and a contaminant concentrating module permeate to form a permeate, and wherein the fixed film biological filter comprises a biologically activated carbon filter;
   (d) a contaminant concentrating module (CCM) comprising a ceramic membrane and a contaminant trap, the CCM connected to a first retentate connector and a second retentate connector, the first retentate connector configured to facilitate transfer of the first retentate from the strainer to the CCM, the second retentate connector configured to facilitate transfer of the second retentate from the filtration unit to the CCM, wherein the ceramic membrane of the CCM is configured to separate each of the first retentate and the second retentate into a third retentate and the contaminant concentrating module permeate, wherein the contaminant trap is configured to receive the third retentate and form it into a contaminant trap slug, and wherein the contaminant trap is positioned below the ceramic membrane while receiving the third retentate from the ceramic membrane; and
   (e) a photocatalytic reactor fluidly connected to the fixed film biological filter through a trickling filter connector and configured to expose the permeate to a photocatalyst and a photocatalytic reaction to generate a photocatalytic permeate, wherein the photocatalytic reactor comprises a photocatalytic reactor membrane configured to retain the photocatalyst within the photocatalytic reactor.

2. The system according to claim 1, wherein the system further comprises:
   at least one of an anaerobic digester, a reverse-osmosis filter module, and a denitrification bioreactor, wherein:
   (i) the anaerobic digester is fluidly connected to the contaminant concentrating module and is configured to digest at least one of the first retentate, the second retentate, the third retentate, and the contaminant trap slug to produce a digestate and a gas,
   (ii) the reverse-osmosis filter module is fluidly connected to at least one of the photocatalytic reactor, the denitrification bioreactor, and the fixed film biological filter, and is configured to reverse-osmosis filter at least one of the permeate, the photocatalytic permeate, and a reduced nitrate permeate to generate a reverse-osmosis permeate; and
   (iii) the denitrification bioreactor is fluidly connected to the reverse-osmosis filter module and is configured to expose at least one of the permeate, the photocatalytic permeate, and the reverse-osmosis permeate to a denitrification reaction to generate the reduced nitrate permeate.

3. The system according to claim 1, further comprising an anaerobic digester fluidly connected to the contaminant concentrating module and configured to digest the contaminant trap slug to produce a digestate and a gas.

4. The system according to claim 1, wherein the filtration unit comprises:
an aeration unit connected to the strainer through the strained fluid connector and configured to receive the strained filtrate and to generate an aerated fluid;
a chemical inlet disposed downstream of the aeration unit, comprising a metering device, and configured to meter an additive into the aerated fluid;
a reactor tank disposed downstream of the chemical inlet and configured to receive and retain the aerated fluid comprising the additive for a retention time generating a retained fluid; and
a ceramic membrane configured to receive and filter the retained fluid generating the filtration unit filtrate.

5. The system according to claim 4, wherein the filtration unit is configured to remove greater than about 75% of solubilized contaminants from the strained filtrate.

6. The system according to claim 1, wherein the permeate formed by the fixed film biological filter comprises at least one of the biological oxygen demand of less than about 30 ppm and a chemical oxygen demand of less than about 200 ppm.

7. The system according to claim 1, wherein the CCM further comprises a housing tank; and a shock wave generator.

8. The system according to claim 2, wherein the anaerobic digester comprises an anaerobic digester tank, a mixer, and a microorganism.

9. The system according to claim 1,
wherein the photocatalytic reactor comprises a photocatalytic reactor tank, a UV light source, a photocatalytic reactor membrane, titanium dioxide, and a titanium dioxide supply tank.

10. The system according to claim 2,
wherein the reverse-osmosis filter module comprises a reverse-osmosis filter housing, a high pressure pump, and a semipermeable membrane, and
wherein the semipermeable membrane comprises a filter pore size of from 0.1 to 5 nm.

11. The system according to claim 2, wherein the denitrification bioreactor comprises a denitrification housing, a denitrification bioreactor membrane, and wood chips.

12. A method for treating a municipal intake fluid comprising a contaminant, the method comprising:
(a) straining the municipal intake fluid with a strainer to form a first retentate and a strained filtrate;
(b) filtering the strained filtrate with a filtration unit to form a second retentate and a filtration unit filtrate;
(c) separating at least one of the first retentate and the second retentate with a ceramic membrane of the contaminant concentrating module to form a third retentate and a contaminant concentrating module permeate;
(d) receiving the third retentate in a contaminant trap positioned below the ceramic membrane of the contaminant concentrating module and concentrating the third retentate in the contaminant trap to from a contaminant trap slug;

(e) filtering at least one of the filtration unit filtrate and the contaminant concentrating module permeate with a fixed film biological filter to form a permeate, wherein the fixed film biological filter comprises a biologically activated carbon filter; and
(f) exposing the permeate to a photocatalytic catalyst and a photocatalytic reaction to generate a photocatalytic permeate, wherein the photocatalytic reactor is fluidly connected to the fixed film biological filter through a trickling filter, and wherein the photocatalytic reactor comprises a photocatalytic reactor membrane configured to retain the photocatalyst within the photocatalytic reactor.

13. The method according to claim 12, wherein the method further comprises:
(i) anaerobically digesting at least one of the first retentate, the second retentate, the third retentate, and the contaminant trap slug to generate a digestate and a gas;
(ii) reverse-osmosis filtering at least one of the permeate, the photocatalytic permeate, and a reduced nitrate permeate to generate a reverse-osmosis permeate;
(iii) exposing at least one of the permeate and the reverse-osmosis permeate to a denitrification reaction to generate the reduced nitrate permeate; and
(iv) producing the reduced nitrate permeate with a denitrification bioreactor.

14. The method according to claim 12, wherein the filtering the strained filtrate with a filtration unit further comprises:
aerating the strained filtrate through an aeration unit to produce an aerated fluid;
metering an additive from a chemical inlet into the aerated fluid;
retaining the aerated fluid comprising the additive in a reactor tank to generate a retained fluid; and
filtering the retained fluid through a ceramic membrane to form the filtration unit filtrate.

15. The method according to claim 12, wherein the filtering the strained filtrate with a filtration unit further comprises removing greater than about 75% of solubilized contaminants from the strained filtrate.

16. The method according to claim 12, wherein the filtering at least one of the filtration unit filtrate and the contaminant concentrating module permeate with the fixed film biological filter further comprises:
receiving at least one of the filtration unit filtrate and the contaminant concentrating module permeate in a biological filter tank;
contacting at least one of the filtration unit filtrate and the contaminant concentrating module permeate with a packing material in the biological filter tank; and
filtering at least one of the filtration unit filtrate and the contaminant concentrating module permeate through a biological filter membrane to produce the permeate.

17. The method according to claim 12, wherein the permeate has a biological oxygen demand of less than about 30 ppm and a chemical oxygen demand of less than about 200 ppm.

18. The method according to claim 12, wherein the separating at least one of the first retentate and the second retentate further comprises:
receiving at least one of the first retentate and the second retentate in a contaminant concentrating module housing.

19. The method according to claim 13, wherein the anaerobically digesting further comprises:

receiving at least one of the first retentate, the second retentate, and the third retentate in an anaerobic digester tank;

combining at least one of the first retentate, the second retentate, and the third retentate with a microorganism inside the anaerobic digester tank to form a microorganism/retentate mixture; and microbially digesting the microorganism/retentate mixture to produce the digestate and the gas.

20. A system for treating a municipal intake fluid comprising a contaminant, the system comprising:
   (a) a rotation drum strainer comprising a rotation drum housing and configured to receive the municipal intake fluid and separate the municipal intake fluid into a first retentate and a strained filtrate;
   (b) a filtration unit connected to the strainer through a strained fluid connector, the strained fluid connector configured to facilitate transfer of the strained filtrate from the strainer to the filtration unit, wherein the filtration unit is configured to separate the strained filtrate into a second retentate and a filtration unit filtrate;
   (c) a fixed film biological filter connected to the filtration unit through a filtrate connector, the filtrate connector configured to facilitate transfer of the filtration unit filtrate from the filtration unit to the fixed film biological filter, wherein the fixed film biological filter is configured to reduce a biological oxygen demand of at least one of the filtration unit filtrate and a contaminant concentrating module permeate to form a permeate, and wherein the fixed film biological filter comprises a biologically activated carbon filter;
   (d) a contaminant concentrating module (CCM) comprising a ceramic membrane and a contaminant trap, the CCM connected to a first retentate connector and a second retentate connector, the first retentate connector configured to facilitate transfer of the first retentate from the strainer to the CCM, the second retentate connector configured to facilitate transfer of the second retentate from the filtration unit to the CCM, wherein the ceramic membrane of the CCM is configured to separate each of the first retentate and the second retentate into a third retentate and the contaminant concentrating module permeate, wherein the contaminant trap is configured to receive the third retentate and form it into a contaminant trap slug, and wherein the contaminant trap is positioned below the ceramic membrane while receiving the third retentate from the ceramic membrane; and
   (e) a photocatalytic reactor fluidly connected to the fixed film biological filter through a trickling filter connector and configured to expose the permeate to a photocatalyst and a photocatalytic reaction to generate a photocatalytic permeate, wherein the photocatalytic reactor comprises a photocatalytic reactor membrane configured to retain the photocatalyst within the photocatalytic reactor.

* * * * *